March 14, 1950  W. E. KUEHLING  2,500,188
LIQUID FUEL METER FOR TRUCKS AND THE LIKE
Filed Feb. 4, 1947  2 Sheets-Sheet 1
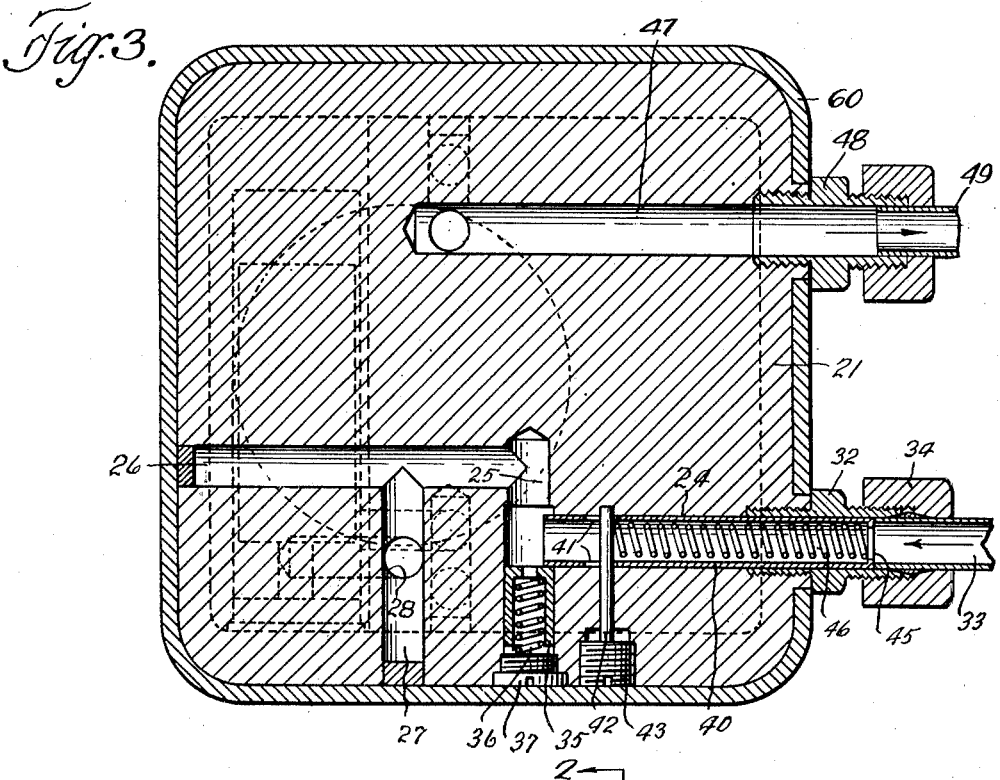
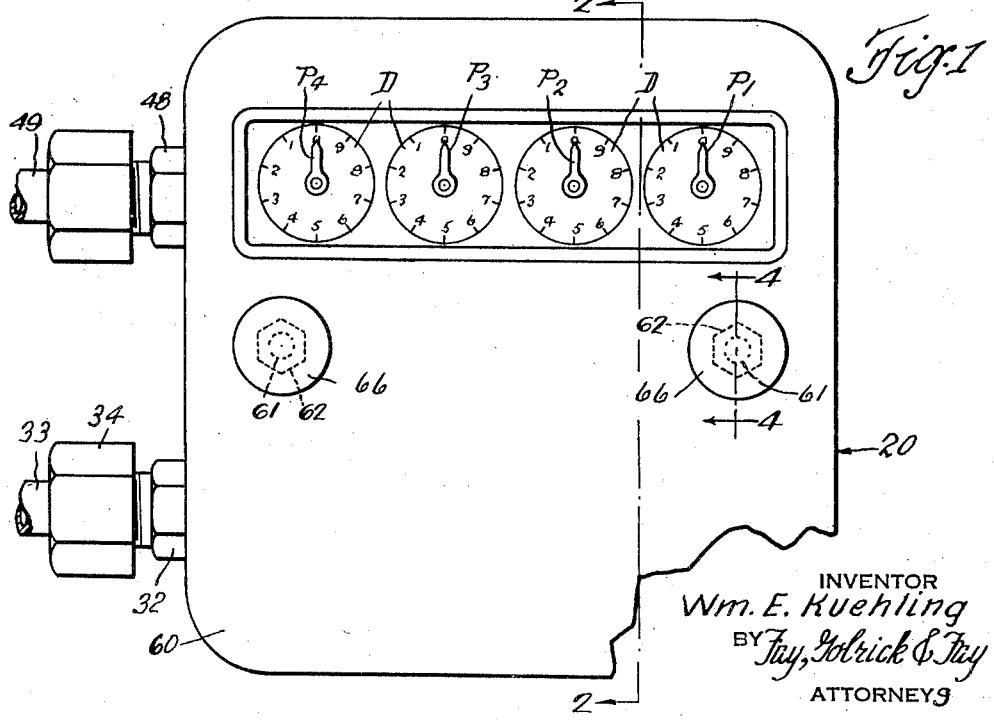
INVENTOR
Wm. E. Kuehling
BY Fay, Golrick & Fay
ATTORNEYS March 14, 1950     W. E. KUEHLING     2,500,188
LIQUID FUEL METER FOR TRUCKS AND THE LIKE
Filed Feb. 4, 1947     2 Sheets-Sheet 2

INVENTOR
Wm. E. Kuehling
BY Fay, Golrick & Fay
ATTORNEYS

Patented Mar. 14, 1950

2,500,188

UNITED STATES PATENT OFFICE 2,500,188

LIQUID FUEL METER FOR TRUCKS
AND THE LIKE

William E. Kuehling, Cleveland, Ohio

Application February 4, 1947, Serial No. 726,401

4 Claims. (Cl. 284—17)

The present invention relates to a meter for registering the volume of gasoline, or other liquid fuel, fed to an engine, such as the engine of a truck.

It has been the experience of a number of truck operating companies that some truck drivers ostensibly purchase a certain amount of gasoline for the operation of the trucks, but in reality a substantially less amount of gasoline is transferred to the fuel tanks of the trucks. These companies are billed for fuel in excess of actual consumption and the dishonest drivers and vendors share in the proceeds from the excess billing. The purpose of the present invention, therefore, is to provide a metering device for use on trucks which will accurately register the amount of gasoline consumed by the operation of the truck and which cannot be removed from the fuel line and actuated by the passage of fluid therethrough to indicate the use of more gasoline than was actually consumed, at least not without detection of such practice.

A principal object of the invention is to provide a meter which can be used in connection with an internal combustion engine driven truck, for example, which will register the number of gallons of fuel fed to the engine during the operation thereof, but in the event the meter is disconnected from the fuel supply line the fuel passageway therethrough will be blocked by a valve which cannot be opened without the destruction of a sealing device.

Other objects and advantages of the invention will be apparent from the following description of a preferred form of embodiment of the invention, reference being made to the accompanying drawings wherein;

Fig. 1 shows a front view in elevation of a meter for registering the amount of gasoline used in a gasoline engine driven truck;

Fig. 3 is a view in section taken on line 3—3 of Fig. 2; and

Figure 2:
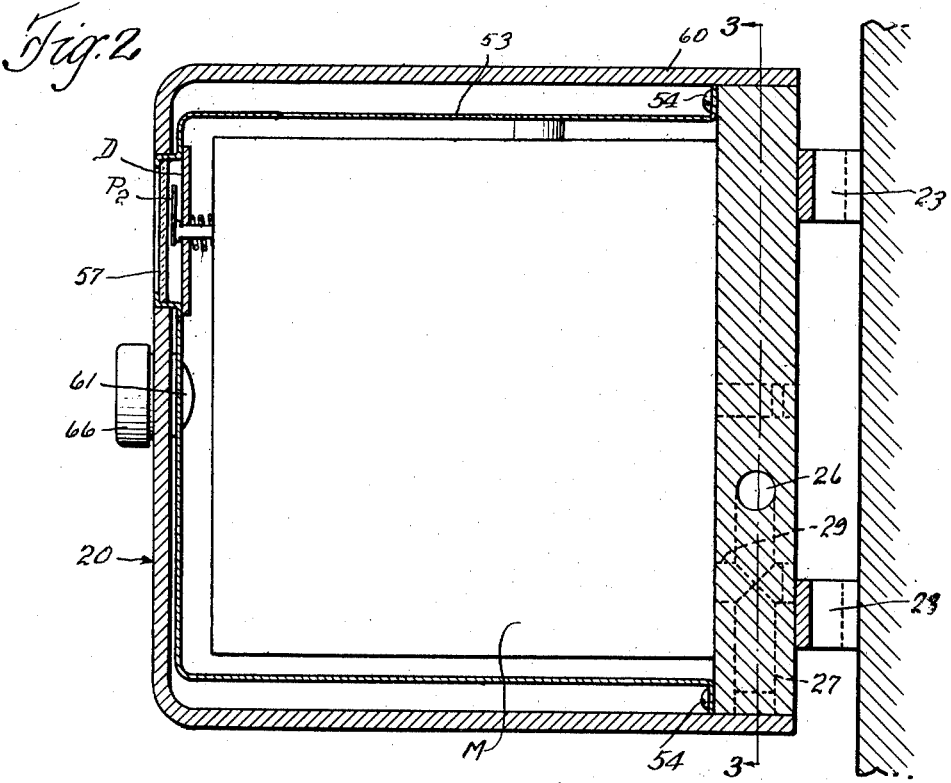
Fig. 2 is a view in section taken substantially on line 2—2 of Fig. 1.
Figure 4:
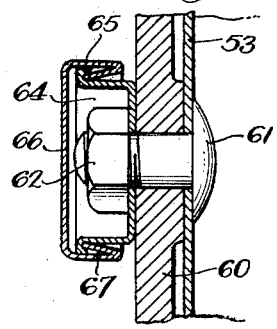
Fig. 4 is a view in section taken on line 4—4 of Fig. 1.

For the purposes of illustrating my invention, I have shown a gasoline meter indicated generally at 20, which meter may be attached to the dashboard of a truck for example, for indicating the volume of fuel, such as gasoline, fed to the carburetor of the truck engine from the fuel pump. In general, the meter 20 comprises a registering device having dials and pointers, and which is operated by a mechanism actuated in accordance with the volume of fuel passing through the meter for indicating such volume in gallon units. The meter also includes a valve mechanism which closes the fuel passage through the meter in the event the meter is disconnected from the fuel inlet conduit for any purpose and which valve mechanism cannot be reopened except by breaking a seal.

More specifically, the meter includes a base 21 which is adapted to be supported on a suitable part of the truck, such as the dashboard, by brackets 23 which are bolted to the dashboard. A suitable liquid metering device, indicated generally at M is mounted on the base 21, and the construction of the device is preferably such that it is inoperative to register gas volumes so that false readings of the meter cannot be effected by air passed through the fuel line, for example. A fuel inlet passage to the metering device is formed in the base by interconnecting bores 24, 25, 26, 27, 28 and 29. Certain of the bores are plugged at their outer ends as indicated, for forming a closed passage. A nipple 32 is threaded into the bore 24 to provide a coupling for connecting a fuel feed pipe 33 to the inlet passage of the meter by a threaded connector 34. The bore 25 is enlarged at its outer portion for receiving a cylindrical valve member 35. The valve member 35 is normally urged into the bore 25 to close the entrance to the latter bore from the bore 24 by a compression spring 36, one end of which seats against a shoulder on the interior of the member 35 and the opposite end of which engages a plug 37 threaded into the outer end of bore 25. The valve 35 is normally maintained open by a sleeve 40 which is slidingly received in bore 24. The sleeve is slotted at 41 and a pin 42 extends transversely of the passage 24 and through the slots 41, it being understood that a bore is formed in the base member 21 for receiving the pin 42, and the pin 42 is locked in place by a plug 43 which is threaded into an opening in the base 21, which opening is in alignment with the bore which receives the pin. The outer end of the sleeve 40 is provided with an inturned flange 45 which forms a stop for a compression spring 46 which is positioned within the sleeve and which is compressed between the pin 42 and the flange 45. The spring 46 normally urges the sleeve 40 to the right, as viewed in Fig. 3, the extent of movement being limited by the abutment of the left hand edge of the slots 41 against pin 42. As may be seen in Fig. 3, when the fuel fed pipe 33 is connected to the inlet nipple 32 of the meter, the end of pipe 33 retains the sleeve 40 in position to block the valve 35 in its open position. Should the meter be disconnected from the inlet pipe 33 the sleeve 40 will be urged to the right permitting valve 35 to close, thus precluding unauthorized operation of the meter by disconecting the same from its supply line and forcing a liquid therethrough. As will be apparent hereinafter, valve 35 cannot be retracted without removing a seal from the meter and therefore tampering with the meter can be detected. Thus, should the truck operator attempt to remove the gas inlet to force liquid into the meter to cause it to indicate a higher consumption of fuel than was actually used in the operation of the truck, the meter will be rendered inoperative and the action of the truck operator can be detected.

The base 21 is also provided with a fuel outlet passage 47 leading from the exhaust of the metering device M, and a nipple 48 is threaded into the passage for connecting the latter with a fuel line 49 leading to the carburetor of the truck engine.

The metering device M preferably includes four dials marked on a face plate and indicated at D, which dials are divided into ten equal sectors and numbered accordingly. Pointers P are provided for cooperation with the dials, and the pointers are interconnected through a gearing, not shown, having a reduction of 10 to 1 between each adjacent pointer. The gearing is adapted to be driven by the passage of fuel through the meter and at a rate corresponding to the rate of flow whereby the pointers cooperate with the dials to indicate tenths of gallons, unit gallons, tens of gallons and hundreds of gallons.

The entire metering mechanism is enclosed hermetically by a casing 53 which is bolted to the base 21 by screws 54, only two of which are shown in the drawings. The casing 53 is provided with a glass window 57 through which the dials and pointers are visible. It will be understood that suitable sealing means is provided between the window and the casing to prevent the escape of air. By enclosing the mechanism in an air tight casing, a leak proof structure is provided, and this also affords a structure which can be sealed against tampering.

An outer protective housing 60 is attached to the casing 53 by two bolts 61, which bolts have nuts 62 threaded thereon. The nuts 62 are covered by a seal which comprises a cup 64 having a curled lip 65 about the periphery thereof and a cap 66 with an inturned flange 67 which is adapted to engage within the lip 65 so that the cap cannot be removed once it has been in place without destruction thereof.

In the event that the operator attempts to disconnect the meter for the purpose of passing a liquid, such as water therethrough, the valve 35 will be actuated to close the fuel inlet passage, by withdrawal of the sleeve 40, as described, and the meter cannot again be operated until the outer casing 60 is removed, which involves the destruction of the seals 66, for gaining access to the valve 35 for resetting it in its open position.

It will be apparent that by my invention I have provided a meter for measuring the flow of gasoline through the carburetor of an engine, and which meter cannot be surreptitiously disconnected from the fuel line for operation by the passage of fluids therethrough by which a false registration could be effected without detection.

It will be appreciated that my invention may be used with any suitable mechanism for metering and registering the flow of fuel to the carburetor of an automobile engine and that the form of meter indicated in the drawing is not necessarily essential to my invention.

Although I have described but one form of the invention, it is to be understood that other forms might be adopted, all falling within the scope of the claims which follow.

I claim:

1. In a liquid fuel meter for an engine, a meter body structure having a fuel passageway therethrough for the passage of fuel to be measured; means for connecting the inlet with a fuel carrying conduit outside the housing; a valve member slidable to a position transversely of said passageway for blocking the latter; a spring urging said valve member to said position; a sleeve slidable in said passageway and extendable in the path of the valve member to latch it in its open position; and spring means urging said sleeve from the valve latching position, said sleeve being engaged by said conduit for preventing sliding thereof by the spring means until said conduit is removed.

2. In a fuel meter for an engine, a meter body structure having a passageway therein for the passage of fuel to be measured; coupling means for connecting a fuel supply conduit with the body structure and in alignment with said passageway; valve means in said body structure arranged to automatically close said passageway when said coupling means is manipulated to disconnect the fuel conduit from the body structure; said valve means being manually opened; and destructible sealing means for blocking access to said valve means for reopening the valve.

3. In a fuel meter for an engine, a meter body structure having a passageway therethrough for the passage of fuel to be measured and having a valve chamber communicating with said passageway and being open to the exterior of the meter body; coupling means for connecting a fuel supply conduit with the body structure and in alignment with said passageway; a valve member in said valve chamber movable to close said passageway; a spring for biasing said member to the closed position; a latch operable for holding the valve in the open position, said latch being held in its operative position by said coupling means when the conduit is coupled to the meter body structure and being movable to release the valve when the coupling means is manipulated to disconnect the conduit from the body structure; and a covering for the exterior opening of the valve chamber.

4. In a fuel meter for an engine, a meter body structure having a passageway therethrough for the passage of fuel to be measured and having a valve chamber communicating with said passageway and being open to the exterior of the meter body; coupling means for connecting a fuel supply conduit with the body structure and in alignment with said passageway; a valve member in said valve chamber movable to close said passageway; a spring for biasing said member to the closed position; a latch operable for holding the valve in the open position, said latch being held in its operative position by said coupling means when the conduit is coupled to the meter body structure and being movable to release the valve when the coupling means is manipulated to disconnect the conduit from the body structure; and a covering for the exterior opening of the valve chamber, said covering comprising a destructible seal.

WILLIAM E. KUEHLING.

REFERENCES CITED

The following references are of record in the file of this patent:

UNITED STATES PATENTS

| Number | Name | Date |
|---|---|---|
| 927,983 | Landau | July 13, 1909 |
| 1,073,719 | Timmer | Sept. 23, 1913 |
| 1,421,905 | Cade | July 4, 1922 |
| 1,671,091 | McGahey | May 22, 1928 |
| 1,689,477 | Capers | Oct. 30, 1928 |
| 1,754,723 | McGahey | Apr. 15, 1930 |
| 1,996,900 | Buckner | Apr. 9, 1935 |
| 2,271,785 | Watkins | Feb. 3, 1942 |

FOREIGN PATENTS

| Number | Country | Date |
|---|---|---|
| 226,606 | Great Britain | Dec. 29, 1924 |